(12) United States Patent
Seki et al.

(10) Patent No.: US 8,650,560 B2
(45) Date of Patent: Feb. 11, 2014

(54) COMPUTER READABLE MEDIUM FOR INSTALLING SOFTWARE

(75) Inventors: Takao Seki, Nagoya (JP); Satoko Ando, Chita (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1053 days.

(21) Appl. No.: 12/646,124

(22) Filed: Dec. 23, 2009

(65) Prior Publication Data

US 2010/0169878 A1    Jul. 1, 2010

(30) Foreign Application Priority Data

Dec. 25, 2008  (JP) ................................ 2008-330452

(51) Int. Cl.
  *G06F 9/44*    (2006.01)
(52) U.S. Cl.
  USPC ......................................................... 717/176
(58) Field of Classification Search
  USPC ......................................................... 717/176
  See application file for complete search history.

(56) References Cited

U.S. PATENT DOCUMENTS

| 7,788,355 | B2 | 8/2010 | Maeda | |
|---|---|---|---|---|
| 2005/0068565 | A1* | 3/2005 | Maeda | 358/1.15 |
| 2006/0176499 | A1* | 8/2006 | Shintoku | 358/1.13 |
| 2007/0011354 | A1 | 1/2007 | Ohara | |

FOREIGN PATENT DOCUMENTS

| EP | 2031496 A1 * | 3/2009 |
|---|---|---|
| JP | 2000-330742 | 11/2000 |
| JP | 2003-046519 A1 | 2/2003 |
| JP | 2005-100270 A | 4/2005 |
| JP | 2007-019614 | 1/2007 |
| JP | 2008-052322 | 3/2008 |

OTHER PUBLICATIONS

Extended EP Search Report dtd Aug. 30, 2010, EP Appln. 09180575.4.

JP Office Action dtd Dec. 7, 2010, JP Appln. 2008-330452, English Translation.

* cited by examiner

*Primary Examiner* — Chun-Kuan Lee
(74) *Attorney, Agent, or Firm* — Banner & Witcoff, Ltd.

(57) ABSTRACT

A computer readable medium may stores a computer program including instructions for ordering a computer mounted on the processing device. The instruction may order the computer to perform acquiring a first IP address assigned to the function performing device, acquiring a unique network device name provided to the function performing device by using the first IP address, attempting to acquire a second IP address by using the network device name, determining whether the second IP address identical to the first IP address has been acquired, and installing the software in which the network device name is set as a destination of the function performing instruction in a case where it is determined that the second IP address which is identical to the first IP address has been acquired.

14 Claims, 4 Drawing Sheets

FIG. 3

| IP Address | Network Device Name | Type Information | Information Location |
|---|---|---|---|
| 192.168.XX.X | PRINTER | ABC | First Office |
| 192.168.X.XX | MFP | DEF | Second Office |
| | | | |
| | | | |

US 8,650,560 B2

COMPUTER READABLE MEDIUM FOR INSTALLING SOFTWARE

CROSS-REFERENCE TO RELATED APPLICATIONS

This application claims priority to Japanese Patent Application No. 2008-330452, filed on Dec. 25, 2008, the contents of which are hereby incorporated by reference into the present application.

TECHNICAL FIELD

The present specification discloses a computer readable medium storing a computer program for installing software on a processing device. The software is for sending a function performing instruction to a function performing device via network.

DESCRIPTION OF RELATED ART

In order to send a function performing instruction to a function performing device (e.g. printer, scanner, etc.), software for sending a function performing instruction is installed on the processing device. Upon installation of the software, a destination of the function performing instruction is set in the software. For example, an IP address of the function performing device is set as the destination of the function performing instruction.

SUMMARY

The IP address set in the function performing device may be assigned automatically using a DHCP (Dynamic Host Configuration Protocol) server. In this type of IP address assigning technique, the IP address of the function performing device may change each time the function performing device is started up. In a case where the IP address of the function performing device changes, the function performing instruction is not sent to the intended function performing device even though the processing device sends the function performing instruction having as its destination the IP address set during installation. The present specification teaches a technique for preventing the processing device from becoming unable to send the function performing instruction to the function performing device.

One technique taught by the present specification is a computer readable medium storing a computer program. The computer program may be for installing software on a processing device, the software being for sending a function performing instruction to a function performing device via a network. The computer program may include the below instructions (1) to (5) for ordering a computer mounted on the processing device.
(1) Acquiring a first IP address assigned to the function performing device.
(2) Acquiring a unique network device name provided to the function performing device by using the first IP address.
(3) Attempting to acquire a second IP address by using the network device name.
(4) Determining whether the second IP address which is identical to the first IP address has been acquired.
(5) Installing the software in which the network device name is set as a destination of the function performing instruction in a case where it is determined that the second IP address which is identical to the first IP address has been acquired.

BRIEF DESCRIPTION OF THE DRAWINGS

FIG. 3 shows a device information table.

EMBODIMENT

Configuration of Network System 10

Figure 1:
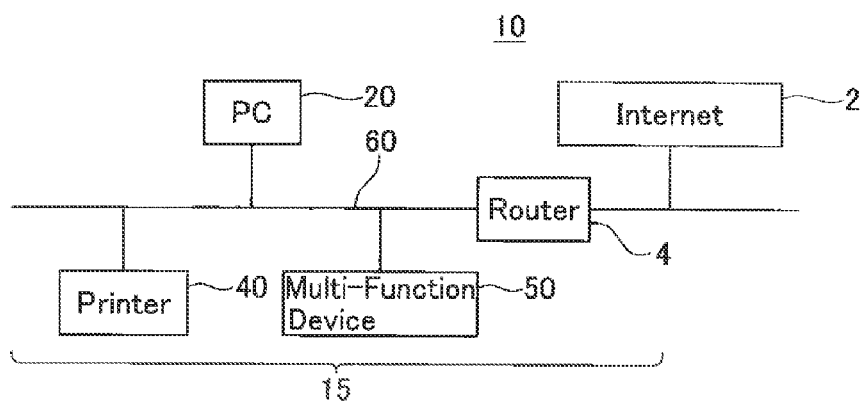
FIG. 1 is a schematic block view of a configuration of a network system.

An embodiment will be explained with reference to the figures. As shown in FIG. 1, the network system 10 comprises a PC 20, function performing devices, e.g., a printer 40 and a multi-function device 50, and a router 4. The PC 20 is connected to the printer 40 and the multi-function device 50 via a LAN (Local Area Network) 60. In the present embodiment, only the printer 40 and the multi-function device 50 are mentioned as the example of the function performing device. However, the function performing device is not restricted to these examples. For example, the function performing device can be a scanner, fax, telephone, etc. There is no particular restriction on the number of function performing devices comprised by the network system 10. Three or more function performing devices may be present, or only one function performing device may be present. The PC 20 can be connected to the Internet 2 via the router 4. If the Internet 2 is assumed as being at an upstream side, a local network 15 is configured by the router 4, and the PC 20, the printer 40, and the multi-function device 50, which exist at a downstream side with respect to the router 4.

Figure 2:
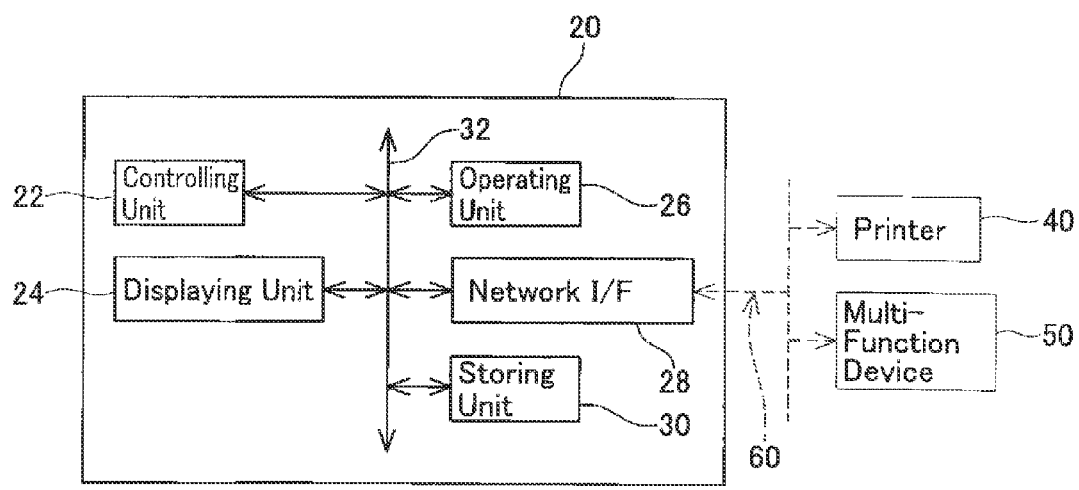
FIG. 2 is a schematic block view of a configuration of a PC.

(Configuration of PC 20)
As shown in FIG. 2, the PC 20 comprises a controlling unit 22, a displaying unit 24, an operating unit 26, a network interface 28 (abbreviated as "network I/F" below and in FIG. 2), and a storing unit 30. The units of the PC 20 are connected by a bus 32. The displaying unit 24 can display various kinds of information. For example, the displaying unit 24 comprises a liquid crystal display. The operating unit 26 comprises a keyboard and a mouse operated by a user. The user can input information and instructions into the PC 20 by operating the operating unit 26. The controlling unit 22 performs various processes in accordance with programs stored in advance in the storing unit 30, and exercises general control over the operation of the PC 20. The process performed by the controlling unit 22 in accordance with the programs stored in the storing unit 30 will be explained later. The programs for the controlling unit 22 are stored in the storing unit 30. A device information table 70 is stored in the storing unit 30 (cf. FIG. 3). The device information table 70 can store an association of an IP address 72 of the function performing device, a network device name 74, type information 76, and a location 78. The controlling unit 22 can store information acquired from the function performing device in the device information table 70. The processes that the controlling unit 22 records in the device information table 70 are explained later. The PC 20 is connected to the printer 40, the multi-function device 50 via the LAN 60 connected to the network I/F 28.

(Function of the Router 4)
As shown in FIG. 1, the router 4 is connected to the PC 20, the printer 40, and the multi-function device 50 via the LAN 60. The router 4 comprises a DHCP server function, assigning an IP address to each device connected to the router 4. Further, the router 4 comprises a DNS server function, searching for the IP address of each device corresponding to the network device name sent from the PC 20, etc., and sending the searched IP address to the source of the network device name (i.e., the sender thereof).

(Function of the Function Performing Device 40, 50)

In a case where the printer 40 and the multi-function device 50 respectively receives a print performing instruction and data for printing from the PC 20 via the LAN 60, the printer 40 and multi-function device 50 respectively prints the image represented by the received data on a print medium. In a case where the multi-function device 50 receives a scan performing instruction from the PC 20 via the LAN 60, the multi-function device 50 scans a scanning object set on a scanning unit (not shown).

(Processes Performed by the Controlling Unit 22 of the PC 20)

In order for the PC 20 to send a print instruction or a scan instruction to the printer 40 or the multi-function device 50 by the user's operation on the operating unit 26 of the PC 20, software must be installed on the PC 20 for sending the instruction. For installing this software, the user operates the operating unit 26 to download desired software from the Internet 2 onto the PC 20. The controlling unit 22 stores the downloaded software in the storing unit 30. The user operates the operating unit 26 to execute an installer that accompanies the software. Alternatively, if the PC 20 can read record media such as a CD-ROM, etc., the user may have the PC 20 read the record medium recording the software and installation. The controlling unit 22 then may perform the process to install the software.

Figure 4:
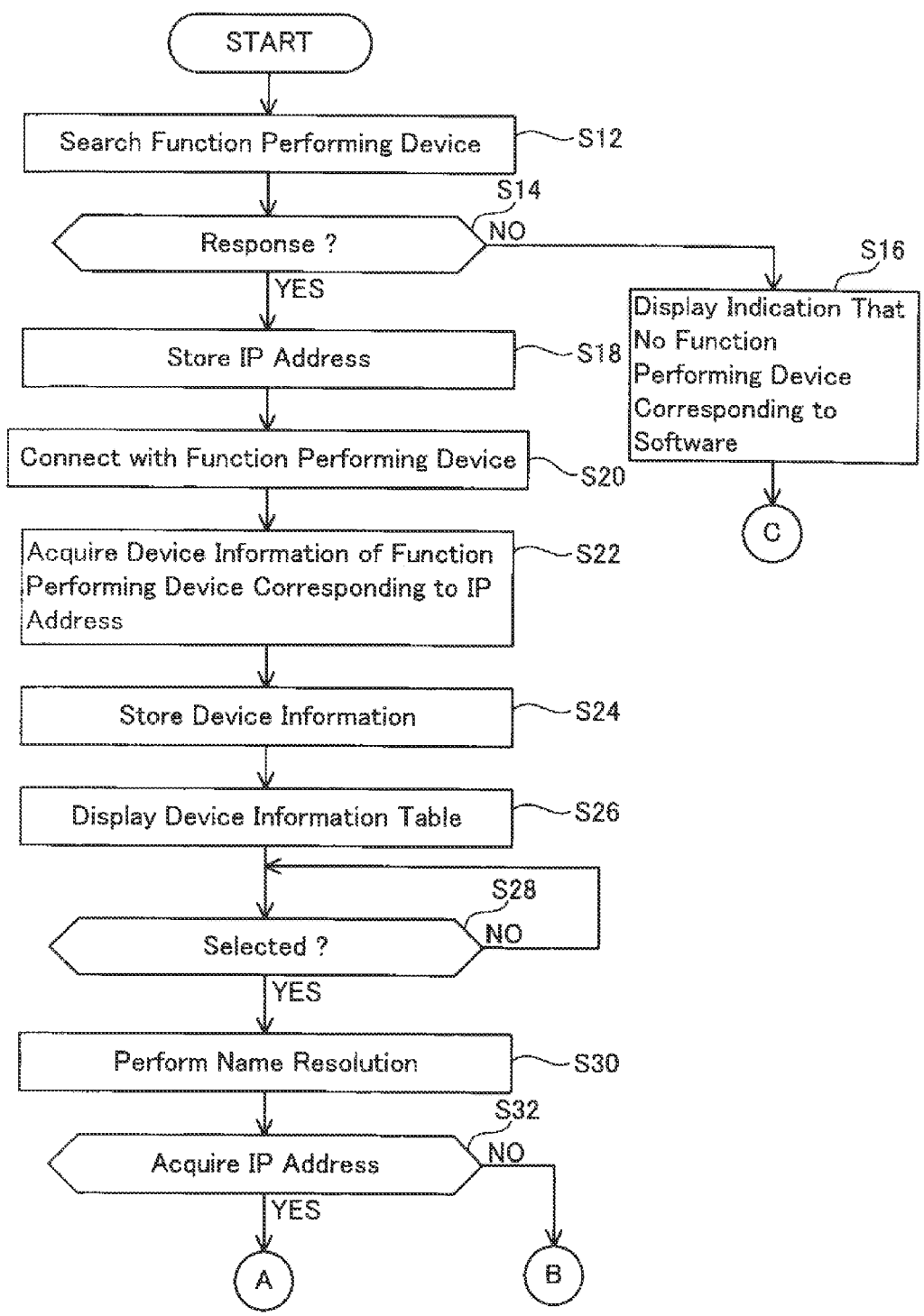
FIG. 4 is a flowchart showing the process sequence performed by a controlling unit.
Figure 5:
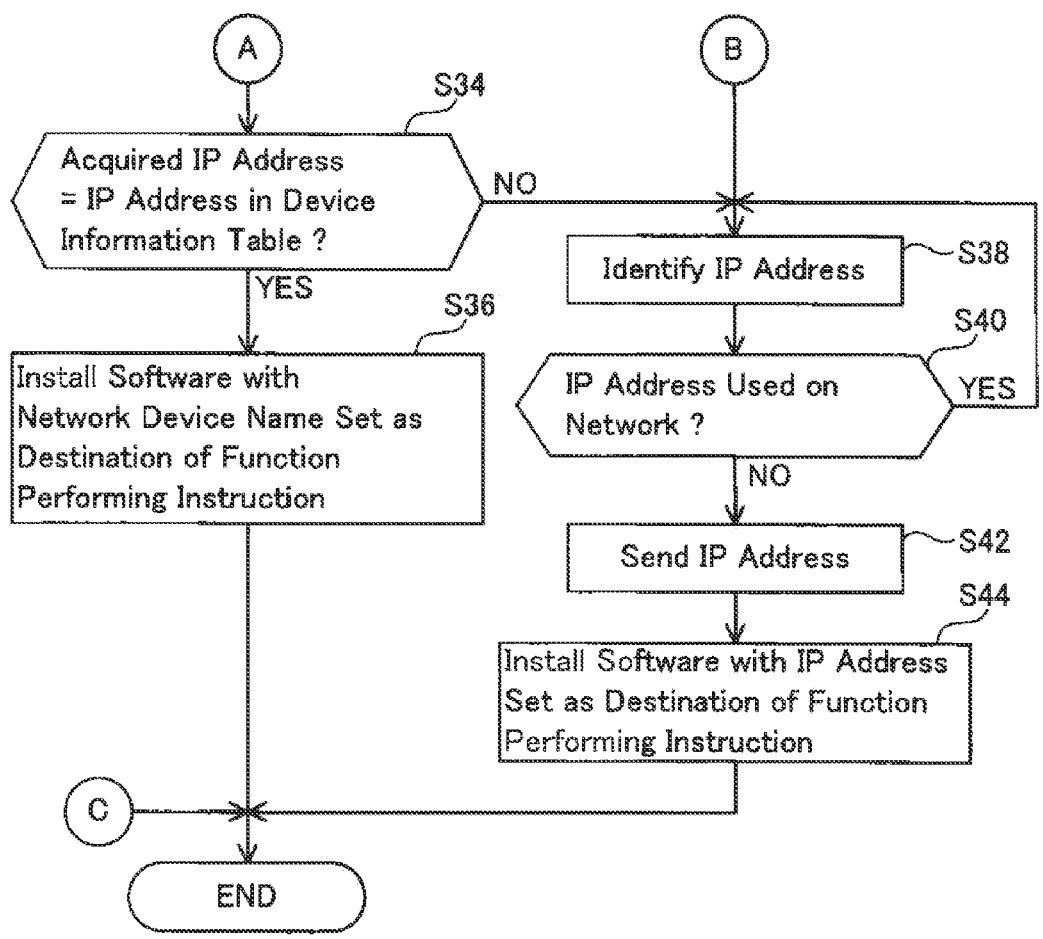
FIG. 5 is a continuation of the flowchart of FIG. 4.

FIGS. 4 and 5 are flowcharts showing the process sequence performed by the controlling unit 22 in a case where the user operates the operating unit 26 to perform an installation (installation by downloading from the Internet 2 or installation by reading from the record medium). Herein, software targeted for installation is termed "object software". The controlling unit 22 searches for the function performing device corresponding to the object software (S12) on the network 15. Specifically, the controlling unit 22 sends a packet including type information corresponding to the object software to the function performing device using broadcast or multicast utilizing an SNMP (Simple Network Management Protocol). If a function performing device finds that the type information included in the packet from the PC 20 matches device information assigned to the function performing device, the function performing device sends the IP address with which it has been assigned to the PC 20 as a response to the packet. The controlling unit 22 monitors for a response from the function performing device being received (S14). If the response is not received from the function performing device (NO in S14), the controlling unit 22 displays an indication in the displaying unit 24 that a function performing device corresponding to the object software is absent on the network 15 (S16), and the controlling unit 22 ends the process (see FIG. 4).

If the response is received from the function performing device (YES in S14), the controlling unit 22 stores the IP address 72 including the response in the device information table 70 of the storing unit 30 (S18). In the present embodiment, an exemplary case is assumed in which a response is returned from both the printer 40 and multi-function device 50. The controlling unit 22 establishes a communication session respectively with the printer 40 and the multi-function device 50 using the IP address acquired in S14 (S20). Specifically, the controlling unit 22 sends a first packet including the acquired IP addresses to the printer 40. The printer 40 which has received the first packet sends a second packet to the PC 20 as the response to the first packet. If communication of at least the first and second packets is performed between the PC 20 and the printer 40, a communication session is established between the PC 20 and the printer 40. Likewise, if communication of at least the first and second packets is performed between the PC 20 and the multi-function device 50, a communication session is established between the PC 20 and the multi-function device 50. Next, the controlling unit 22 acquires device information including a network device name, type information, a location, etc. from each of the printer 40 and the multi-function device 50 utilizing an SNMP GET command (S22). Note that the network device name and the location have been set by the user in advance. The controlling unit 22 stores the device information acquired from the printer 40 and the multi-function device 50 in association with the respective IP addresses 72 in the device information table 70 (S24). The controlling unit 22 displays the device information table 70 in the displaying unit 24 (S26). By operating the operating unit 26, the user can select, from among the function performing devices stored in the device information table 70 (in the present embodiment, the printer 40 and the multi-function device 50), the function performing device which should be the destination of the function performing instruction (print instruction, scan instruction, etc.) that will be sent using the object software. The controlling unit 22 waits until the user selects the printer 40 or the multi-function device 50 (S28).

If the printer 40 or multi-function device 50 has been selected (YES in S28), the controlling unit 22 performs name resolution using the network device name of the selected function performing device (S30). The present embodiment exemplary assumes that the printer 40 has been selected in S28, and the controlling unit 22 performs name resolution using "PRINTER" as the network device name of the printer 40 in S30. Specifically, the controlling unit 22 sends the network device name "PRINTER" to the router 4. The router 4 searches for the IP address corresponding to the received network device name "PRINTER" in the network 15. If an IP address was hit during this search, the router 4 sends the IP address to the PC 20. If an IP address was not hit, the router 4 sends to the PC 20 information indicating that no IP address has been found.

The controlling unit 22 monitors for an IP address being received from the router 4 (S32). If the answer is YES in S32, the controlling unit 22 proceeds to S34 of FIG. 5. If the answer is NO in S32, the controlling unit 22 proceeds to S38 of FIG. 5. In S34, it is determined whether the IP address acquired in S32 is identical to the IP address associated with the network device name 74 "PRINTER" in the device information table 70. If the answer is NO in S34, the controlling unit 22 proceeds to S38. If the answer is YES in S34, the object software is installed with the network device name 74 "PRINTER" as the destination of the function performing instruction (S36), and the process ends.

In S38, the controlling unit 22 identifies one IP address based on the IP address and the Subnet mask set to the PC 20. The method of identifying the IP address, that is, an IP address identifying process performed by the controlling unit 22 is explained below. The controlling unit 22 sets the lowest 8 bits of the IP address to "254", and the other portions of the IP address to the same bits as the IP address of the PC 20. For example, in the event of the Subnet mask of the PC 20 masking a portion other than the lowest 8 bits ("255.255.255.0") and the IP address of the PC 20 being "192.168.111.1", the controlling unit 22 sets the IP address to "192.168.111.254". Alternatively, e.g., in the event of the Subnet mask of the PC 20 being "255.255.0.0", the controlling unit 22 can set the lowest 16 bits of the IP address to be "255.254", and the other portion of the IP address can be the same as the IP address of the PC 20.

The controlling unit 22 verifies whether the IP address identified in S38 is not being used elsewhere (S40). Specifically, the controlling unit 22 sends a PING (Packet Internet Groper) command utilizing ICMP (Internet Control Message Protocol) with the identified IP address as a destination. In a case where the controlling unit receives a response to the PING command, the controlling unit 22 determines that the IP address is already being used elsewhere. If the answer is YES in S40, the controlling unit 22 returns to S38, and newly identifies one other IP address. For example, if YES is determined in S40 for an IP address having the lowest 8 bits "254", the lowest 8 bits may be identified in descending order until NO is determined in S40. That is, the controlling unit 22 may identify the IP address of the lowest 8 bits as "253".

If the answer is NO in S40, the controlling unit 22 sends an IP address set command including the IP address identified in S38 and the Subnet mask identical to the PC 20 to the printer 40 utilizing an SNMP SET command (S42). The controlling unit 22 sends the IP address set command with the IP address stored in the device information table 70 as the destination. The printer 40 thereby sets the IP address and the Subnet mask received from the PC 20 as its own IP address and Subnet mask. After the printer 40 sets the IP address and Subnet mask, the printer 40 sends a signal to the PC 20 showing that setting has ended. The controlling unit 22 then installs the object software with the IP address sent in S42 as the destination of the function performing instruction (S44), and the process ends. The controlling unit 22 performs S44 after receiving the signal from the printer 40 that setting of the IP address has ended. That is, the object software is installed on the PC 20 after the IP address has been set by the printer 40. Consequently, the function performing instruction in which the destination of the IP address is set using the installed object software is not sent before the IP address is assigned to the printer 40. Consequently, it is possible to prevent the function performing instruction having been sent using the installed software from failing to reach the printer 40. However, sending the IP address to the printer 40 may be performed after installation of the object software.

The controlling unit 22 of the PC 20 performs name resolution utilizing the network device name before installing the object software (S30-S34 of FIGS. 4, 5). The PC 20 installs the object software with the network device name as the destination of the print command only if an IP address recorded in the device information table 70 could be acquired using name resolution. The PC 20 does not install the object software with a network device name, which failed name resolution, as a destination of the print command. As a result, in a case where the PC 20 sends a print command with the network device name of the printer 40 set as the destination, failure of the name resolution can thereby be prevented. In a case where the object software is installed in the process S36 of FIG. 5, the PC 20 can acquire the IP address of the printer 40 by performing name resolution utilizing the network device name "PRINTER" (by contacting the router 4 having the DNS server function), and can send function performing instructions to the printer 40 with that IP address as the destination. Since the network device name is set as the destination of function performing instructions, the PC 20 can send function performing instructions to the printer 40 even if the IP address of the printer 40 has changed.

For example, in a case where the DHCP server function of the router 4 has the function of automatically registering, in the DNS server, the network device name and the IP address assigned to the function performing device. In this case, the user may manually assign a different IP address to the function performing device after the IP address and the network device name have been registered in the DNS server. In this case, the information registered in the DNS server is not updated. Consequently, the IP address registered in the DNS server and the IP address actually assigned to the function performing device may differ. In this state, if the controlling unit 22 installs software having the network device name as the destination of the function performing instruction, the IP address acquired by name resolution and the IP address actually assigned to the function performing device differ in a case where the PC 20 sends the function performing instruction. The PC 20 can no longer send the function performing instruction to the function performing device. In this technique, software is installed after verifying that the name resolution of the network device name has been correctly performed. Consequently, upon sending the function performing instruction, the instruction can be sent to the function performing device without the name resolution failing.

If the IP address recorded in the device information table 70 could not be acquired using name resolution (if the answer is NO in S32 of FIG. 4 or S34 of FIG. 5), the controlling unit 22 identifies the IP address of the printer 40 and installs the object software with this identified IP address as the destination of the print command. Consequently, the PC 20 can send a print command to the printer 40 without performing any name resolution. In the above embodiment, the identified IP address is set in the printer 40 by the SNMP SET command. In this case, the IP address of the printer 40 is fixed. That is, the IP address of the printer 40 does not change as a result of the actions of the DHCP server (of the router 4).

Further, in a case where the controlling unit 22 identifies the IP address of the printer 40, the lowest 8 bits of the IP address are first determined as "254". If the IP address in which the lowest 8 bits are "254" is in use elsewhere, the lowest 8 bits are identified in descending order "253", "252", . . . until an IP address not being used elsewhere is found. In general, in a case where IP addresses are automatically assigned by the DHCP server, etc., the lowest 8 bits are often comparatively small. Consequently, it is likely that an IP address in which the lowest 8 bits are small is being used elsewhere. By identifying the IP address in descending order from the lowest 8 bits being "254", an IP address not being used elsewhere can be found in a comparatively short time.

Variant Embodiment

In the above embodiment, the controlling unit 22 sends, to the printer 40, a set command including the IP address for which NO was determined in S40 of FIG. 5 and the Subnet mask of the PC 20 (S42 of FIG. 5). Alternately, the controlling unit 22 may cause a display on the displaying unit 24 to prompt the user to set, in the printer 40, the IP address for which NO was determined in S40 of FIG. 5. The user can set the IP address displayed on the displaying unit 24 and a Subnet mask identical to the PC 20 in the printer 40. In a case where the PC 20 comprises a printing function, the printing function may print to prompt the user to set, in the printer 40, the IP address for which NO was determined in S40 of FIG. 5. With this configuration, as with the above embodiment, the incorrect performance of name resolution can be prevented in a case where the print command is to be sent from the PC 20 to the printer 40.

In the network 15, name resolution may be performed utilizing a WINS server if a NetBIOS (Network Basic Input Output System) name is used as the network device name.

In a case where name resolution is failed, the technique may cause the controlling unit 22 to perform a display process for displaying the failure of the name resolution in a display unit 24 of the PC 20. The user can thereby take measures to perform name resolution correctly. For example, the user can make the controlling unit 22 perform the processes S12-S34 of FIGS. 4, 5 again. Alternatively, the user can verify the DNS server, etc., utilized in the name resolution.

What is claimed is:

1. A non-transitory computer readable medium storing a computer program, the computer program for installing software on a processing device, the software being used for sending a function performing instruction to a function performing device via a network, the computer program including instructions for ordering a computer mounted on the processing device to perform steps comprising:
  acquiring a first IP address assigned to the function performing device;
  acquiring a unique network device name provided to the function performing device by using the first IP address;
  attempting to acquire a second IP address by using the network device name in a situation that the processing device is configured to communicably connect with the function performing device using the acquired first IP address;
  determining whether the second IP address identical to the first IP address has been acquired;
  installing the software in which the network device name is set as a destination of the function performing instruction in a case where it is determined that the second IP address identical to the first IP address has been acquired;
  prohibiting the installation of the software in which the network device name is set as the destination of the function performing instruction in a case where it is determined that the second IP address identical to the first IP address has not been acquired;
  acquiring an IP address by using the network device name in a case of sending the function performing instruction by using the installed software; and
  sending the function performing instruction by using the acquired IP address as a destination.

2. The non-transitory computer readable medium as in claim 1, further including instructions for ordering the computer to perform steps comprising:
  identifying a third IP address not used on the network in a case where it is determined that the second IP address identical to the first IP address has not been acquired;
  outputting a particular instruction for assigning the function performing device with the third IP address; and
  installing the software in which the third IP address is set as the destination of the function performing instruction.

3. The non-transitory computer readable medium as in claim 2, wherein the installing the software in which the third IP address is set as the destination of the function performing instruction is performed after the third IP address has been assigned to the function performing device.

4. The non-transitory computer readable medium as in claim 2, wherein the particular instruction is an instruction for assigning the function performing device with the third IP address as a fixed IP address of the function performing device.

5. The non-transitory computer readable medium as in claim 4, wherein the installing the software in which the third IP address is set as the destination of the function performing instruction is performed after the third IP address has been assigned to the function performing device.

6. The non-transitory computer readable medium as in claim 2, wherein the identifying the third IP address includes:
  identifying an IP address;
  determining whether the identified IP address is being used on the network; and
  identifying another IP address in a case where it is determined that the identified IP address is being used on the network,
  wherein in a case where it is determined that the identified IP address is not being used on the network, the outputting step outputs the identified IP address as the third IP address.

7. The non-transitory computer readable medium as in claim 1, wherein
  the attempting to acquire the second IP address includes attempting to acquire the second IP address from a device comprising a DNS server function,
  the acquiring the IP address by using the network device name includes sending the network device name to the device comprising the DNS server function and acquiring the IP address, and
  the sending the function performing instruction includes sending the function performing instruction by using the IP address acquired from the device comprising the DNS server function.

8. A processing device configured to install software for sending a function performing instruction to a function performing device via a network, the processing device comprising:
  a first acquiring unit configured to acquire a first IP address assigned to the function performing device;
  a second acquiring unit configured to acquire a unique network device name provided to the function performing device by using the first IP address;
  an attempting unit configured to attempt to acquire a second IP address by using the network device name in a situation that the processing device is configured to communicably connect with the function performing device using the acquired first IP address;
  a determining unit configured to determine whether the second IP address which is identical to the first IP address has been acquired;
  an installing unit configured to:
    install the software in which the network device name is set as a destination of the function performing instruction in a case where it is determined that the second IP address identical to the first IP address has been acquired; and
    prohibit the installation of the software in which the network device name is set as the destination of the function performing instruction in a case where it is determined that the second IP address identical to the first IP address has not been acquired; and
  a sending unit configured to acquire an IP address by using the network device name and send the function performing instruction by using the acquired IP address as a destination in a case of sending the function performing instruction by using the installed software.

9. The processing device as in claim 8, further comprising:
  an identifying unit configured to identify a third IP address not used on the network in a case where it is determined that the second IP address identical to the first IP address has not been acquired, and
  an outputting unit configured to output a particular instruction for assigning the function performing device with the third IP address, wherein the installing unit configured to install the software in which the third IP address is set as the destination of the function performing instruction.

10. The processing device as in claim 9, wherein the installing unit is configured to install the software in which the third IP address is set as the destination of the function performing instruction after the third IP address has been assigned to the function performing device.

11. The processing device as in claim 9, wherein the particular instruction is an instruction for assigning the function performing device with the third IP address as a fixed IP address of the function performing device.

12. The processing device as in claim 11, wherein the installing unit is configured to install the software in which the third IP address is set as the destination of the function performing instruction after the third IP address has been assigned to the function performing device.

13. The processing device as in claim 9, wherein the identifying unit is configured to:

identify an IP address;
determine whether the identified IP address is being used on the network, and
identify another IP address in a case where it is determined that the identified IP address is being used on the network,
wherein in a case where it is determined that the identified IP address is not being used on the network, the outputting unit outputs the identified IP address as the third IP address.

14. The processing device as in claim 8, wherein
the attempting unit is configured to attempt to acquire the second IP address from a device comprising a DNS server function, and
the sending unit is configured to send the network device name to the device comprising the DNS server function and acquire the IP address, and send the function performing instruction by using the IP address acquired from the device comprising the DNS server function.

* * * * *